United States Patent

Johnson

(10) Patent No.: US 6,580,837 B1
(45) Date of Patent: Jun. 17, 2003

(54) UP-SAMPLING DECIMATED COLOR PLANE DATA

(75) Inventor: Louis Johnson, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/457,058

(22) Filed: Dec. 7, 1999

(51) Int. Cl.$^7$ ................................................ G06K 9/32
(52) U.S. Cl. ...................... 382/300; 382/264; 382/267; 345/606; 345/616
(58) Field of Search ................................ 382/276–308, 382/257, 264, 272, 275, 267; 375/240.01, 240.21; 348/392.1, 424.1, 423.1; 358/525; 345/606, 616

(56) References Cited

U.S. PATENT DOCUMENTS

| | | | | |
|---|---|---|---|---|
| 4,630,307 A | * | 12/1986 | Cok ............................ 382/165 |
| 4,843,631 A | * | 6/1989 | Steinpichler et al. ........ 382/280 |
| 5,040,064 A | * | 8/1991 | Cok .......................... 348/392.1 |
| 5,187,755 A | * | 2/1993 | Aragaki ....................... 382/239 |
| 5,339,172 A | * | 8/1994 | Robinson ..................... 358/462 |
| 5,384,643 A | * | 1/1995 | Inga et al. ................... 358/403 |
| 5,420,693 A | * | 5/1995 | Horiuchi et al. ......... 358/426.14 |
| 5,739,841 A | * | 4/1998 | Ng et al. ..................... 347/237 |
| 5,799,112 A | * | 8/1998 | de Queiroz et al. ......... 382/254 |
| 5,859,920 A | * | 1/1999 | Daly et al. .................. 382/115 |
| 5,875,268 A | * | 2/1999 | Miyake ....................... 382/276 |
| 5,990,950 A | * | 11/1999 | Addison ...................... 348/273 |
| 6,125,212 A | * | 9/2000 | Kresch et al. .............. 382/250 |
| 6,332,030 B1 | * | 12/2001 | Manjunath et al. ......... 382/100 |
| 6,343,159 B1 | * | 1/2002 | Cuciurean-Zapan et al. ..... 382/284 |

\* cited by examiner

*Primary Examiner*—Amelia M. Au
*Assistant Examiner*—Ryan J. Hesseltine
(74) *Attorney, Agent, or Firm*—Steven D. Yates

(57) ABSTRACT

A method for determining a value for an unknown picture element (pixel) T based on neighboring pixel values of a checkerboard decimated color plane. Immediate and extended neighborhood pixel values are selected. In one configuration, immediate neighborhood pixel values are averaged. In another configuration, all neighborhood pixels are averaged. A binary pattern is determined by comparing the average with each immediate and extended neighborhood pixel values. The binary pattern is reduced to identify a set of coefficients for the binary pattern. A summed cross-product is computed for the set of coefficients and each pixel value of the immediate and extended neighborhoods. In one configuration, coefficients are stored in look up tables, where different tables correspond to different input image types. In another configuration, multiple lookup tables are stored within input images, allowing different image reconstruction options based on the embedded tables. In a further configuration, an image capturing device analyzes the image being captured, and embeds a lookup table within the image corresponding to the image type for the image, e.g., fast action shot, low-lighting, portrait, etc.

18 Claims, 6 Drawing Sheets

UP-SAMPLING DECIMATED COLOR PLANE DATA

FIELD OF THE INVENTION

The invention generally relates to discrete sampled image data, and more particularly to up-sampling discrete sampled checkerboard decimated image data, where an interpolated pixel element (PEL) is determined according to neighboring discrete image samples.

BACKGROUND

Processing digitally captured input images is more accurate when separate color sensors are used to measure contributions of base colors used to represent color image data. Typical base colors include Red, Green, Blue (RGB), Cyan, Magenta, Yellow (CYM), or other color bases that can be combined to represent visible colors. To capture a particular input image, sensors attuned to particular base colors are used to identify each base color's contribution to the image. In a digital context, the sensors break the input image into discrete pixel elements (PELs), and the term "resolution" indicates the number of pixels available to a sensor for receiving input image color data. Common resolutions are 640×480, 800×600, 1600×1200, etc. If separate color sensors are available, then the entire resolution of one sensor is available to receive a particular color plane's input color data, e.g., that color's contribution to the input image.

Unfortunately, multiple sensors increase cost and complexity. The complexity arises from having to precisely split incoming light into the various base colors, so that the same pixel element of each sensor receives its appropriate portion of the incoming light defining the input image. (If the input light is incorrectly split, then color distortion and mis-registration blur results.) In addition, even if light is precisely split, the splitter unavoidably absorbs input light and reduces overall light intensity reaching each of the sensors. As the sensitivity of the individual sensors do not change with their application, the available light must be increased by a factor equal to the number of sensors used, or a loss of sensitivity to light must be accepted in the implementation. Additionally, more light is lost by subsequent color filters used to key a sensor to one of the base colors. Thus, to minimize these losses, large, heavy, optically precise and pure (e.g., more expensive) lenses are required to maximize available light for each sensor. The higher costs can make the image capture device prohibitively expensive, and the additional weight can reduce the breadth of application for such an implementation.

To reduce costs complexity, and weight, and also to better utilize the light available to sensors through inexpensive optics, capturing devices are instead being developed with a single sensor. With a single sensor, no light splitter is required, resulting in more light available to the sensor. Since there is one sensor, available sensor PELs must be assigned to receive one of the base colors, normally utilizing a regular pattern which divides the PELs among the desired color planes. Thus, for each base color, there will be gaps in the received color data for sensor pixels that have been assigned to measure a different base color. To compensate for these gaps, received image data is interpolated, or up-sampled, to guess missing image intensity values.

One well-known regular pattern decimation method is the BAYER technique (U.S. Pat. No. 3,971,065). This technique results in one color plane that is arranged in a checkerboard pattern, using 50% of the PELs, with the other two planes linearly decimated and using 25% of the PELs each. In U.S. Pat. No. 4,630,307, Cok then: teaches a pattern recognition method for up sampling the resultant data. These patents assume an RGB color scheme and teach sampling an image with the checker board, PELs dedicated to receiving green color intensities, while red and blue are assigned: the remaining linearly sampled sensor PELs (e.g., the sensor pixels define a grid having receptors keyed as GRGB . . . both horizontally and vertically from the leading G (see:

FIG. 6 of 3,971,065). The ratio accentuating green values corresponds to research indicating the human perception system is more attuned to changes in green values, and therefore a disproportionate amount of the pixel data needs to be directed towards receiving green image values.

To determine missing pixel values, Cok teaches assigning an unknown pixel T a value derived from contributions from values in an immediately surrounding pixel neighborhood. For example, consider a 3×3 pixel sequence from an image sensor's green components:

| —  | B1 | —  |
|----|----|----|
| B2 | T  | B3 |
| —  | B4 | —  |

In Cok, the unknown pixel T is assigned a value expressed as a combination of known, pixels B1–B4. The exact contribution of each B is decided by averaging B1–B4, and then comparing the average against each B value to determine a binary pattern of high-low values based on the comparison. The pattern is looked up in a table which maintains a concordance between particular patterns and classifies the pattern found as either a stripe, corner or edge. The contributions to be ascribed to each neighborhood pixel are then defined as one of three specific formulas for computing T.

A significant problem with this and related techniques, however, is that T is being defined with respect to a very limited context area. Consequently, when analyzing ambiguous input data, or high-detail image data, the guessed value may be sub-optimal. As the resolution of today's sensors increase, the differences between adjacent PELs is changed. When combined with a consumer's expectation of a sharper image, and the lower cost of applying complex algorithms, the technique described by Cok is no longer satisfactory.

SUMMARY

In one embodiment of the invention, a method is disclosed for determining a value for an unknown pixel T. An immediate neighborhood of pixel values and an extended neighborhood of pixels values are selected. An average pixel value of the immediate neighborhood of pixel values is computed. The average pixel value is compared to the immediate and extended neighborhood pixel values, and a binary pattern determined based on the comparing. The binary pattern is reduced and a set of coefficients identified for the reduced binary pattern.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Figure 1:
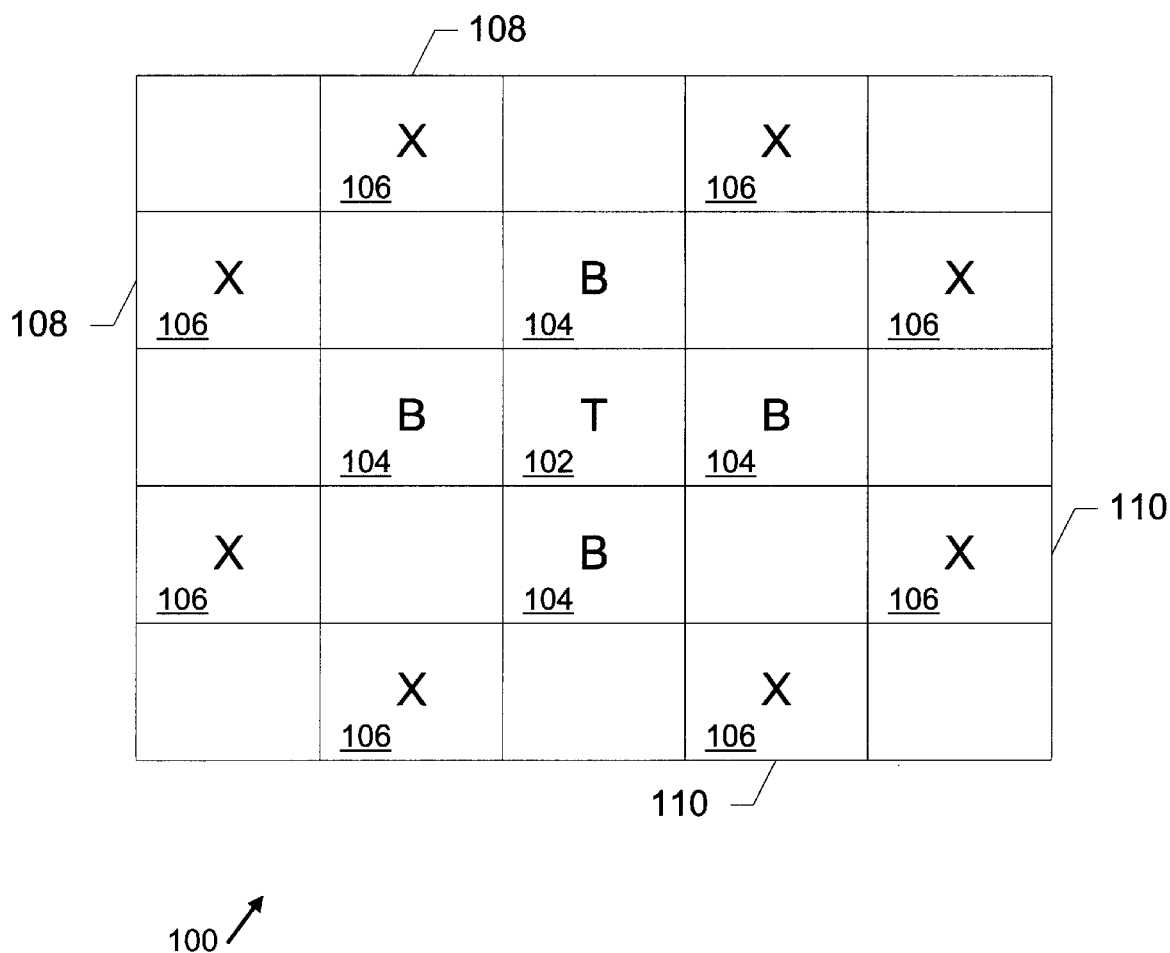
FIG. 1 illustrates one embodiment improving on the Cok algorithm.

FIG. 1 illustrates one embodiment of an improvement for algorithms such as the Cok algorithm referenced above used to up-sample a green plane that has been decimated into a checkerboard pattern. One problem with current up-sampling algorithms is that they use a pattern recognition technique that is ineffective when applied to certain image input data, such as high-detail image areas. To address this shortcoming, a large context area for an unknown pixel (or pixel neighborhood) is used. (To allow a more direct comparison with Cok, it is assumed that a green color plane is being analyzed and reconstructed; however it is understood that the invention is applicable to analyzing and reconstructing other checker board decimated color planes as well.) FIG. 1 shows a collection of pixels 100 (or pixel elements (PELs)). It is assumed they represent a portion of input image data captured by a digital camera charged coupled device (CCD) or other digital imaging input, and that some pixel values are unknown. A goal is to determine the median intensity value for an unknown pixel T 102 based on the values of known surrounding pixel data. However, rather than basing a value for T 102 solely on the values of an immediate neighborhood 104 ("B") of pixels, e.g., as taught by Cok, instead the value of T is also based on the values of an extended neighborhood 106 ("X") of pixels. This larger context allows determining more accurate values for T with input data that is otherwise ambiguous to the Cok technique.

Figure 2:
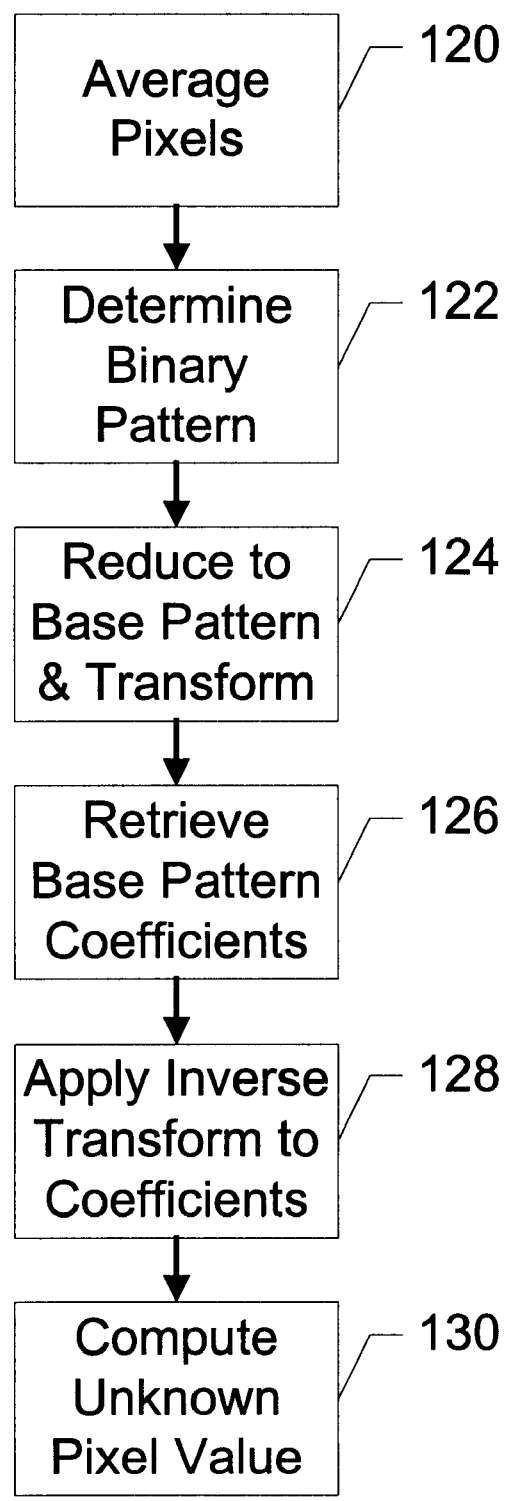
FIG. 2 is a flowchart illustrating one embodiment utilizing immediate and extended pixel neighborhoods to more accurately compute an unknown pixel.

FIG. 2 is a flowchart illustrating one embodiment utilizing the immediate 104 and extended 106 neighborhoods to more accurately compute T 102.

In this embodiment, a first operation is to compute an average 120 (or mean) value for the immediate neighborhood 104 "B" pixels. Note that an alternate embodiment may instead average all pixels in both neighborhoods 104, 106, since using the local and extended neighborhoods reduces error in computing T. For higher resolution images, it is important to minimize error in computing T.

A binary pattern is then determined 122 by comparing the mean value with the intensity value for each pixel in the immediate 104 and extended 106 neighborhoods. In one embodiment, pixels values greater-than or equal to the mean value are assigned a value of 1, and those less than the mean are assigned a 0. Thus, the neighborhood pixels define a 12 bit binary encoding, corresponding to $2^{12}=4,096$ possible binary neighborhood patterns.

To avoid having to manipulate 4,096 patterns, since it can be impractical in imaging devices having restricted memory, in one embodiment the 4,096 patterns are reduced by accounting for possible transformations to base patterns. Many patterns are the same but for a rotation or flip (mirror) over an axis. For example, in FIG. 1, a pattern of the upper-left pixels 108 being 1 and the rest 0 is a 180° rotation of a pattern of the lower-right pixels 110 being 1 and the rest 0. Reducing the 4,096 patterns results in 547 base patterns and 8 ($2^4$)transformations. (The term Cidx is used as an index referencing the base patterns, and the term Oidx is used as an index referencing the transformations).

Figure 3:
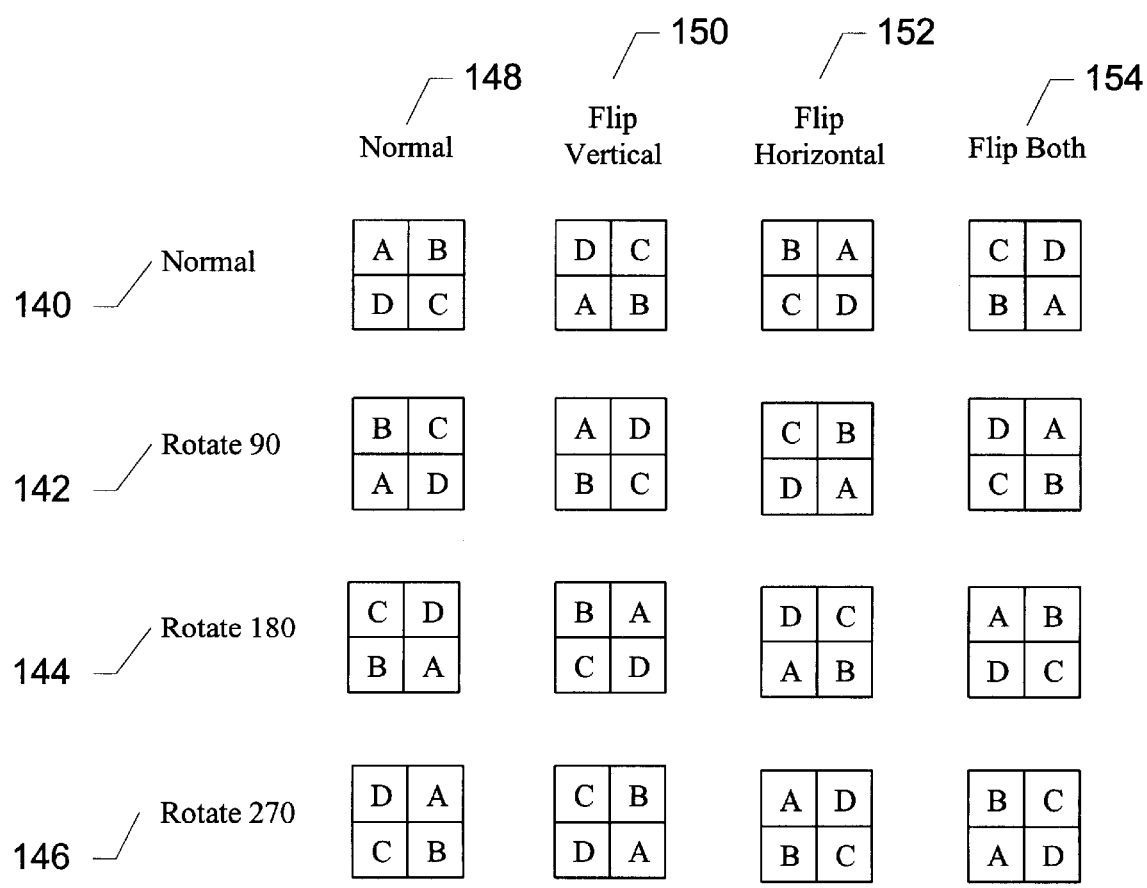
FIG. 3 is a chart illustrating 16 possible combinations of rotations and flips.

FIG. 3 is a chart illustrating the 16 possible combinations of rotations and flips.

Inspecting of the chart reveals that the following pairs are identical:

| Normal | 140 | Normal | 148 | & | Rotate 180 | 144 | Flip Both | 154 |
|---|---|---|---|---|---|---|---|---|
| Rotate 90 | 142 | Normal | 148 | & | Rotate 270 | 146 | Flip Both | 154 |
| Rotate 180 | 144 | Normal | 148 | & | Normal | 140 | Flip Both | 154 |
| Rotate 270 | 146 | Normal | 148 | & | Rotate 90 | 142 | Flip Both | 154 |
| Normal | 140 | Flip Vertical | 150 | & | Rotate 180 | 144 | Flip Horizontal | 152 |
| Rotate 90 | 142 | Flip Vertical | 150 | & | Rotate 270 | 146 | Flip Horizontal | 152 |
| Rotate 180 | 144 | Flip Vertical | 150 | & | Normal | 140 | Flip Horizontal | 152 |
| Rotate 270 | 146 | Flip Vertical | 150 | & | Rotate 90 | 142 | Flip Horizontal | 152 |

Therefore, the 16 possible patterns reduce to 8 unique patterns. In one embodiment, the following transformations are utilized:

| Normal | 140 | Normal | 148 | — | | — | | |
|---|---|---|---|---|---|---|---|---|
| Rotate 90 | 142 | Normal | 148 | — | | — | | |
| — | | — | | Normal | 140 | Flip Both | 154 | |
| — | | — | | Rotate 90 | 142 | Flip Both | 154 | |
| Normal | 140 | Flip Vertical | 150 | — | | — | | |
| Rotate 90 | 142 | Flip Vertical | 150 | — | | — | | |
| — | | — | | Normal | 140 | Flip Horizontal | 152 | |
| — | | — | | Rotate 90 | 142 | Flip Horizontal | 152 | |

These particular eight transformations were chosen to minimize hardware computation requirements. That is, flipping is typically a less expensive operation (e.g., requires less computing resources) than rotating, and rotating 180° less costly than a quarter rotation.

Continuing again with FIG. 2, the binary pattern is then reduced 124 into Cidx and Oidx reference values. In one embodiment, the Cidx is used as an index into a table containing entries for each base pattern. One skilled in the art will recognize that tables are used for exemplary purposes, and that other structures, such as databases, objects (e.g, OLE, ActiveX, COM, DCOM, etc.), graphs, or the like, may also be used. An entry includes 12 coefficients, or multipliers, that can be applied to immediate 104 and extended 106 neighborhood pixels to determine their contribution towards the unknown pixel T 102. Coefficients may be stored in floating point or scaled integer format. Quantization errors are increased as the resolution (bitcount) of the coefficient is reduced. The specific storage will be based upon the exact implementation technique applied. Oidx value is used to match coefficients with neighborhood pixels. That is, an original pixel configuration was transformed to match it to one of the 547 base patterns; Oidx indicates how to undo that transformation. (In embodiments not reducing the 4,096 patterns, this operation corresponds to using the binary pattern to index an entry in the table of coefficients.)

One skilled in the art will understand there are many possible approaches to reducing 124 the pattern. In the preferred embodiment, a translation table accepts the 12 bit deterministic pattern and directly convert it into a 3 bit Oidx and a 10 bit Cidx. In an alternate embodiment, Oidx is generated by a 12 bit by 3 bit lookup table while the coefficient lookup function would permit certain locations to be accessed by more than one 12 bit pattern, thus eliminating the need for Cidx. Another embodiment uses enough memory to store duplicate coefficients in their respective locations, in which Oidx and Cidx would no longer be needed.

The entries corresponding to Cidx are retrieved 126 from the table, matched 128 with the neighborhood pixels 104, 106 according to Oidx, and then used to compute 130 a value for T 102. (Matching is only required if the 4,096 possible patterns have been reduced to fewer base patterns.)

If coefficient reduction was utilized, the identified coefficients and their respective source PELs must be matched back up in order to undo the rotation and flipping. In one embodiment, matching is performed by arranging retrieved table coefficients in a pattern corresponding to a top-down left-to-right traversal of the FIG. 1 neighborhood 104, 106 grid. This initial coefficient pattern arrangement is then transformed according to the Oidx value, so that the coefficient pattern is matched with the correct pixel values. Note that the Oidx may store the original transformation of the neighborhood pattern, hence matching requires application of an inverse operation. In another embodiment, rather than rearranging the retrieved table values, instead Oidx corresponds to rearranging the neighborhood pixels 104, 106 to correspond with the arrangement of the table's data.

Once coefficients are properly matched 128 with neighborhood pixel values, the value of unknown pixel T 102 can be computed 130 as the sum of contributions from each coefficient-weighted immediate 104 and extended 106 neighborhoods. That is if the retrieved table entries were 0.1, 0.2, 0.3, . . . , 0.4, and the neighborhood pixel values 10, 20, 30, . . . , 120, then T=(0.1·10)+(0.2·20)+(0.3·30)+. . . .+ (0.4·120), i.e., a weighted sum. (Note that the resultant product should be clamped to the minimum and maximum dynamic range values allowed for PELs.)

In one embodiment, portions of Motion Picture Experts Group (MPEG) pixel interpolation methods (e.g., as in MPEG decoders) is employed to assist determining values for missing neighborhood pixels. Feature recognition (e.g., person or object recognition) algorithms are used to determine syntactic context for a picture, allowing selection between different coefficient tables and thus better pixel prediction (e.g., if syntactic context indicates a partial capture of a person's features, this gives strong clues as to proper values for missing pixels).

Other techniques that may be used include user selection for specific effects in the same manner that a user selects the composition type on an automated still camera, broader feature recognition than what can be accomplished in a single neighborhood. Or, in multiple-frame data (e.g., a video-type data), previous frame data can be used to refine syntactic context. For example, motion estimation techniques may be used to help select a correct set of coefficients. (e.g. if a large block of PELs is noted to be in motion, the border of that block could use a set of coefficients specifically designed for the interface between an object in motion and a background that is not. In addition, blur detection can be used to select a coefficient table oriented to poor resolution entities.

Thus, when applying coefficients to an image being up-sampled, determining feature context can be used to switch between several sets of coefficients, each set optimized for a given image feature. For example, when feature recognition identifies an image of a person, "portrait coefficients" can be used in place of other coefficient tables that might otherwise be selected as applicable to the image. (See FIG. 6.)

Figure 4:
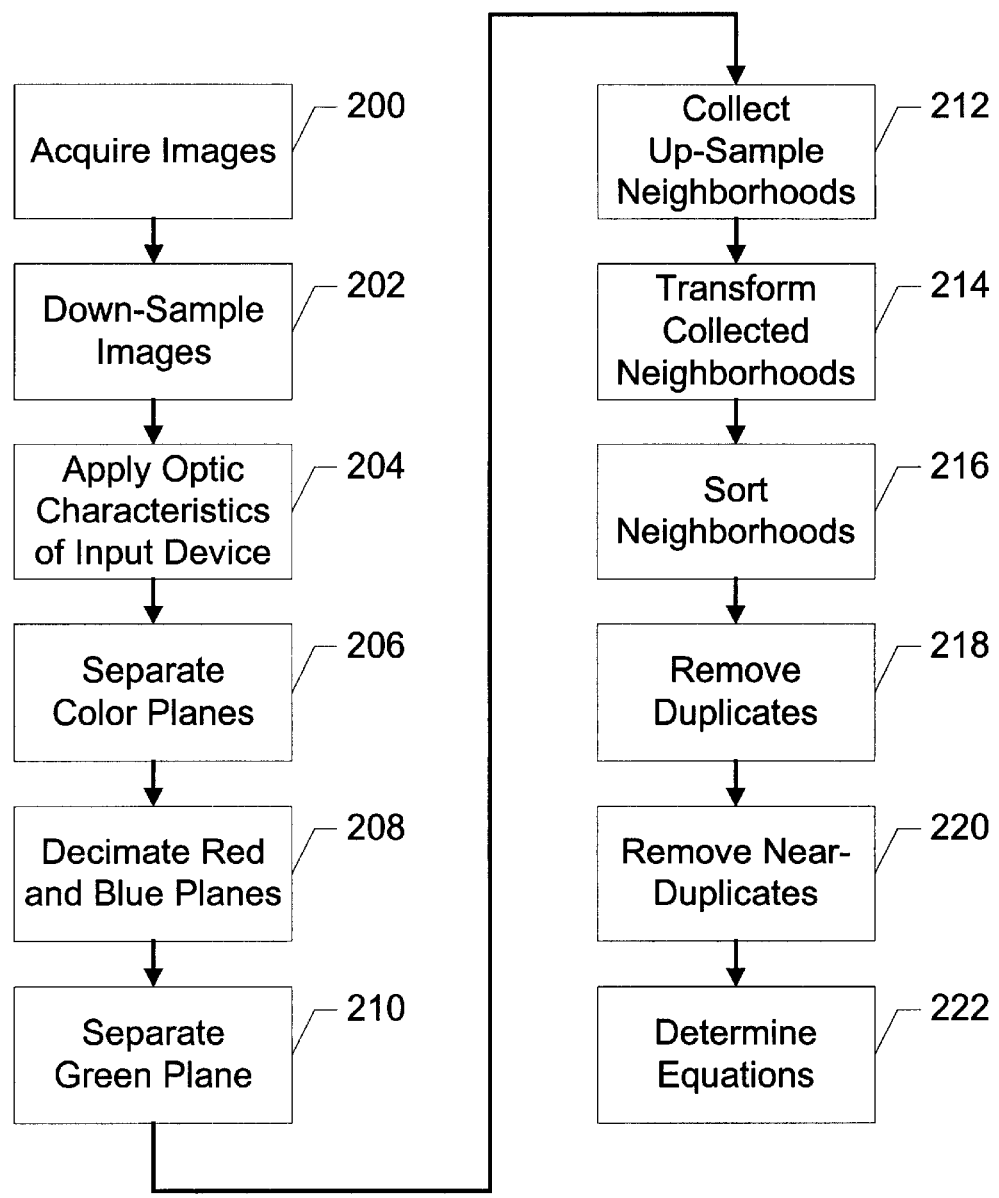
FIG. 4 is a flow-chart showing one method for preparing a coefficient table.

FIG. 4 is a flow-chart showing one method for preparing a coefficient table. Each table entry, as discussed above, defines particular weightings to be applied to each neighborhood pixel for determining unknown pixel T 102. The particular weightings stored in the table are dependent on the type of images being analyzed. Note that the coefficients are typically applied only to a single color plane, hence the concept of differing colors does not apply. Instead, what is being analyzed are typical gradients between various shades of the plane's color.

Table creation can be targeted at a single general purpose table producing moderate quality images across all content, or, it can be targeted to specific classes of images, to improve the target class at the cost of potentially degrading other classes. If the implementation uses loadable coefficient storage, then the image capture device can be configured for a particular image type. This allows optimizing picture quality based on user interests.

Generally, in creating the table, the goal is to analyze a series of images sharing a similar characteristic, and create table entries that weight neighboring pixel contributions consistent with the similar characteristic. Pictures taken under certain lighting or environmental conditions are analyzed to identify characteristic features for those images. Analysis of a set of pictures taken at dusk may reveal that certain colors are muted or non-existent, or other colors exaggerated. Or, it might be known that a collection of pictures concerns high-speed activity, such as car racing, where colors are blurred, perhaps in a known direction (context is simply a matter of inspecting pictures with particular traits).

Other examples include animations, portraits, action, landscapes, machinery, etc. Other attributes can be applied (e.g., associated with a set of input images) to the sample set as needed. If a general purpose table is to be targeted, the image series would be widely varied, and the context would center around the conditions specific to a particular image capturing device's optical system and/or the intended application (e.g. a camera intended for video phone usage would use pictures having a shallow depth of field, largely constituting various talking head subjects).

In one embodiment, a set of images is acquired 200 using standard photography and high resolution (e.g., 24, 36, etc. bits per pixel) scanning. Preferably, the sample images include a large number of images sharing a common feature, aspect, or context, as more images provide a better statistical basis for predicting values in an input image (sharing the common feature, aspect, or context) being up-sampled.

A high quality down-sampler (or down-scaler) is used to scale down 202 each sample input image to a particular image sensor's resolution and generate full resolution color planes. Each down-sampled (scaled) image of the sample set is then processed 204 with a low pass filter that simulates the optics in the imaging device (e.g., a consumer camera, conferencing camera, etc.) providing the source material to be up-sampled. If there are any irregularities in the imaging device's optical bandwidth, they are addressed here. Note that if the filtering applied at this stage does not closely model the actual physical optics, the resultant coefficients will be sub-optimal. The goal is to match the sample images to an ideal version of the imaging device having all color plane data received as its inputs.

Each image is then separated 206 into constituent color planes, e.g., red, green and blue (RGB), cyan, yellow, magenta (CYM), etc. (It is assumed herein that a RGB color model is being used.)

Each color plane is then decimated 208 such that any pixel corresponding to an input sensor site that does not contribute that color has been removed. That is, an input image is expected to be captured by a single digital image sensor collecting color samples for multiple color planes. Thus, for each color plane, there are sensor gaps corresponding to pixels being used for the other color planes. In order for the input images to be effectively used to predict color values for an input image, the sample images need to be as if having undergone the capture process.

In one embodiment, emphasis is placed on the re-generation of missing data in a checkerboard decimated plane, where the other two planes are also decimated and then up-sampled using the intended techniques so the benefits of the checkerboard up-sampling embodied herein can be more accurately evaluated. This is particularly important if the remaining two plane's data will be correlated with the checkerboarded plane during the up-sampling process.

In embodiments of the invention which improve upon the Cok technique for up-sampling image data, as discussed above, the input image sensor pixels are distributed 50% for green reception (checkerboard pattern) and 25% each for red and blue color receptivity. Thus, decimation results in a linear decimation in both the X and Y axis, with a half-size reduction in each plane's dimension. Note that each of these planes is offset from each other by 1 pixel in each axis. In one embodiment, the red and blue plane pixels are not used when up-sampling the green plane, and are just used to generate their own full size planes when full image reconstruction is performed. In an alternate embodiment, a statistical correlation is prepared between the red/blue and green planes, to allow fine-tuning up-sampled green values according to the derived statistical correlation. These correlations may be applied in the form of coefficient modification, or they may be applied to the resultant PEL in a separate operation.

The original un-decimated green plane is separated 210 to generate a plane which contains only target pixels, which we will refer to as the Target plane. This is used in conjunction with the checkerboard decimated plane, which we will refer to as the Checkerboard plane corresponding to input sensor pixels. Note that the Target plane contains PELs that do not correspond to physical sensor PELs assigned to the green plane. The Target plane represents an ideal result of up-sampling, as these pixels are the missing pixels that would be estimated from input image data. If the Target plane and the Checkerboard plane were placed one on top of the other, the entire green plane would then be visible, having no missing PELs.

The Target plane's pixels do not contribute to the up-sampling equation, but are used to test for error while deriving a coefficient table from a particular set of input images. The Checkerboard plane PELs correspond to values that would be contributed by an input sensor providing an input image, and they do correspond to physical sensor PELs that are assigned to the green plane. These PELs are used in the up-sampling equation (e.g., the coefficients for each pixel in a neighborhood). The effect of the checkerboard decimation, is to produce target and checkerboard planes with X axes having been scaled down by a factor of 2, and each Y dimension remaining the same. (Note that adjacent horizontal lines are skewed from each other by 1 pixel.)

Up-sampling neighborhoods are then collected 212 by "walking" the green planes of each sample image, and taking 1 pixel from the first target green plane, and 12 pixels from the second sensor green plane. In one embodiment, walking does not include, gathering neighborhoods overlapping any border or corner; only those pixels having a full 12 pixel neighborhood (e.g., items 104, 106 of FIG. 1) are considered. In this embodiment, if fifty 640×480 sample input images are used, this results in 7,568,400 neighborhoods extracted by walking the sample images.

In an alternate embodiment, overlapping a border or corner is allowed, and a neighborhood is created by using last known pixel values. Thus, an edge may be padded out to provide values for missing neighborhood PELs. In another embodiment, the PELs leading to the edge are reflected to provide missing neighborhood PELs. Since the borders account for a very small percentage of the overall neighborhoods, the impact of their presence or lack thereof is presumed negligible.

Each collected neighborhood is then transformed 214 by applying rotation and mirroring/flipping algorithms so that each neighborhood is "reduced", or oriented, to match one of the base neighborhood patterns in a set of reduced neighborhood patterns. (See, e.g., FIG. 2, item 124 discussion). A list of equations is built for each of the 547 possible patterns. Once a neighborhood has been identified as belonging to a: particular pattern, it is added to that pattern's list.

The transformed pattern lists can then be sorted 216 to remove 218 duplicate patterns. This can significantly reduce the size of the set of patterns. But, it also eliminates weightings favoring frequently occurring pixel sets. Consequently, in an alternate embodiment, a counter is associated with each entry in a pattern's list, allowing tracking the frequency of occurrence for a particular relationship of PELs within a particular pattern.

The sorted pattern lists are then further reduced 220 by identifying neighborhoods that are identical except for an offset. (At this point, typical image contexts result in 70,000–100,000 unique neighborhoods. Some contexts, such as animation or images with lots of solid areas, produce a smaller unique neighborhood sets.) For example, if set A is defined as 25={10, 20, 30, 20, 30, 20, 10, 20, 30, 20, 10, 20}, and set B is defined as 35={20, 30, 40, 30, 40, 30, 20, 30, 40, 30, 20, 30}, then sets A and set B are identical when the offset of 10 is not considered. Note that the left side value came from the target plane, and the right side set of values came from the checkerboard plane.

In one embodiment, priority is given to sets having a target value closer to the midrange value. (The midrange value is the value in the middle of the dynamic range of a PEL. If each PEL is 8 bits deep, then the dynamic range is 0 to 255, with a midrange of 128). In the previous example, assuming 128 is the midrange value we would keep set B and throw out set A, as set B's target of 35 is closer to 128 than set A's target value of 25. This is to help avoid clipping in the detection algorithms. The target values correspond to computing a value for unknown pixel T 102 of FIG. 1 based on the neighborhood values for a sample set.

A set of equations is then determined 222 such that the equations mimic what an up-sampler would do in order to establish an initial set of coefficients. It is understood that math computation programs such as Mathcad or Mathematica, spreadsheet programs such as Lotus 123 or Excel, or other specialized application programs, may be used to derive these equations. (Note that all marks are the property of their respective owners.) The following pseudo-code describes one method for determining the equations:

```
• Ca through Cm = Guess_coefficients;
• Predpixel[n] = (P[n]a•Ca + P[n]b•Cb +
        P[n]c•Cc + P[n]d•Cd + P[n]e•Ce + P[n]f•Cf + P[n]g•Cg +
        P[n]h•Ch + P[n]i•Ci + P[n]j•Cj + P[n]k•Ck + P[n]m•Cm)
    Where:
        Predpixel is the predicted-pixel result of the equation
        P       is a neighborhood
        C       is a coefficient
                a through m identify a specific pixel within the neighborhood
        n       is the neighborhood under test.
• Subtract the corresponding target pixel in the target plane from Predpixel[n] to
    produce an error value, e.g., pixel_Error = Predpixel[n] – corresponding
    Targetpixel[n];
• Accumulate the error produced by applying an estimated set of coefficients to all
    of the neighborhood entries in a single pattern list. This can be expressed by the
    following pseudo-code:
        TotalError = 0;
        For(n = 0; n < neighborhoods_to_test; n++)
        {   Predpixel[n] = (P[n]a•Ca + P[n]b•Cb +
                P[n]c•Cc + P[n]d•Cd + P[n]e•Ce + P[n]f•Cf + P[n]g•Cg +
                P[n]h•Ch + P[n]i•Ci + P[n]j•Cj + P[n]k•Ck + P[n]m•Cm);
            pixel_Error = Predpixel[n] – Targetpixel[n];
            TotalError = TotalError + abs(pixel_Error);
        }
• Adjust the coefficients. Excel tools such as solver, or tools that work with root
    solving, best fit functions, or the like, may be used to determine the next "best
    set" of coefficients to try. The basic premise is to adjust each coefficient to
    determine their impact on total error (recall the ideal image values were retained
    in the first green plane). Then, knowing the basic sensitivity, adjust each
    coefficient so as to minimize error. The following is pseudo-code for performing
    the adjustment:
        BestError = VERY_LARGE_VALUE
        LastError = BestError – 1;
        Ca through Cm = Guess_coefficients;
        SaveCa through SaveCm = Ca through Cm;
        While( IsChanging(BestError, LastError) )
        {   TotalError = 0;
            For( n = 0; n < neighborhoods_to_test; n++ )
            {   Predpixel[n] = (P[n]a*Ca + P[n]b*Cb +
                    P[n]c*Cc + P[n]d*Cd + P[n]e*Ce + P[n]f*Cf +
                    P[n]g*Cg + P[n]h*Ch + P[n]i*Ci + P[n]j*Cj +
                    P[n]k*Ck + P[n]m*Cm );
                pixel_Error = Predpixel[n] – Targetpixel[n];
                TotalError = TotalError + pixel_Error;
            }
            if( TotalError < BestError )
            {   SaveCa through SaveCm = Ca through Cm;
                BestError = TotalError;
            }
            Ca through Cm = GetNewCoefficients( BestError,
                LastError, TotalError, Ca through Cm );
            LastError = TotalError;
        }
```

After performing the above pseudo-code, the coefficient error has been minimized and can be saved in SaveCa through SaveCm.

Note that the initial value of the coefficients has a direct impact on the final set of coefficients, as there may be multiple solutions, and the starting point can impact convergence. Consequently, in an alternate embodiment, multiple starting points are tried (sequentially or in parallel) in an effort to find a more optimal solution.

The IsChanging() function determines whether proposed adjustments to the coefficients are resulting in a negligible impact; if so, then further adjustments are halted. In an alternate embodiment, this could be used to trigger purposeful perturbation of coefficients in an attempt to further refine the convergence. Note that this function is present simply for computation efficiency; in alternate embodiments, an exhaustive search can be performed. Also, as noted previously, even though the pseudo-code solution is performed linearly, alternate embodiments may solve this problem in parallel by dividing different tests and/or program sequences across different processors within a single computer, or by distributing computation tasks among plural interconnected (e.g., by a bus or network) computing devices.

The GetNewCoefficients() function can be a root solver, function fitter, or other algorithm as desired by one analyzing the sample input images. One skilled in the art will recognize that there are many different algorithms to choose from, each having its benefits and detriments. In one embodiment, multiple different algorithms are tested to determine which combination of algorithms best minimizes error. A combination of algorithms can achieve better results since some algorithms are more effective at making large scale changes, getting the coefficients roughly finalized, while other algorithms are more effective with fine detail work if they have a good initial approximation.

After a set of coefficients has been determined with the above pseudo-code for, one pattern, the sequence is repeated for the remaining patterns. The repetition can be automated to occur without user intervention. When completed for all 547 patterns, a table of coefficients is now known for the type of input images presented for analysis. In one embodiment, many different categories of pictures are determined, and exemplary sample pictures for each are analyzed to prepare coefficient tables for each. In one embodiment, an image capturing device, such as a camera, embeds an image type into each captured image. The embedding can be a prearranged identifier for specific tables, a complete dedicated table, or a modification to a base table. Such a type can be determined through typical object-based image inspection methods (e.g., MPEG image analysis techniques which augment image reconstruction through semantic analysis of image data). In one embodiment, an operator of the capturing device selects a specific subject type to aid this determination.

Figure 5:
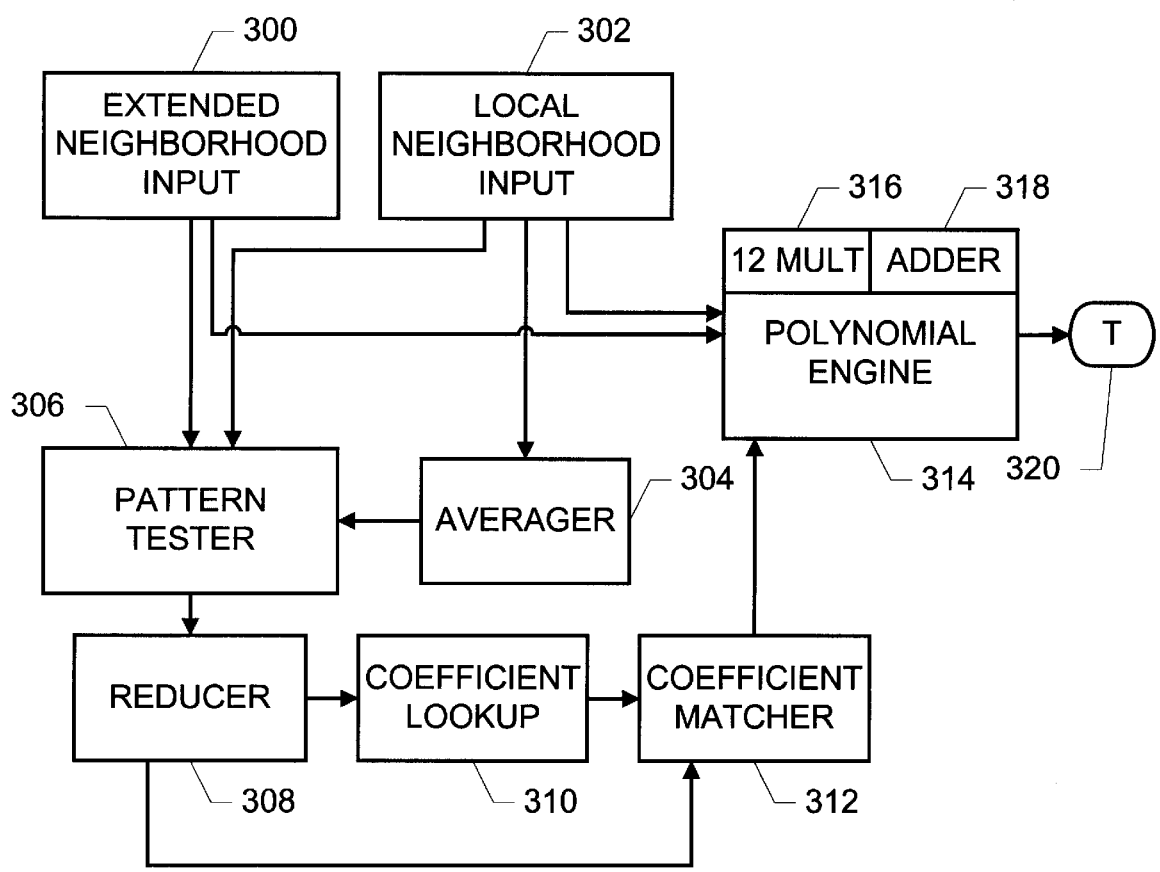
FIG. 5 is a high-level component diagram for one embodiment of the invention.

FIG. 5 is a high-level component diagram for one embodiment of the invention. The illustrated hardware environment can be incorporated into any image recording device, such as digital cameras, video recording hardware (video-cameras), or the like.

Shown are inputs for eight extended neighborhood 300 pixel values, and four immediate neighborhood 302 pixel values. Not shown are an image input sensor and components to inspect and traverse the sensor to provide the extended and immediate neighborhood pixel values. The four immediate neighborhood values are provided to an averager 304 which computes an average of the four values. This average value is provided along with all twelve input values 300, 302 to a pattern tester 306.

The pattern tester determines a 12-bit binary pattern for the twelve input values (see FIG. 2), and the 12-bit binary pattern is provided to a reducer 308. The reducer determines a base pattern (e.g., Cidx) and transform (e.g., Oidx) required to match the 12-bit binary pattern to the base pattern.

The output from the reducer is provided to a coefficient lookup component 310 which inspects a memory (not shown) containing coefficients for each known base pattern. The lookup component 310 retrieves appropriate coefficients according to the base pattern identified by the reducer 308.

The output from the reducer is also provided to a coefficient matcher 312, along with the retrieved coefficients identified by the reducer 308. The coefficient matcher undoes the reduction transform (if applicable) applied to an original neighborhood pixel ordering pattern so as to match retrieved coefficients with original neighborhood pixel locations. Note that in the FIG. 4 embodiment, the input 300, 302 is not required to perform the matching. So long as the coefficients are consistently applied (e.g., in a predicted pattern), the matcher 312 can simply re-arrange the ordering of the coefficients.

The output of the matcher 312 is presented to a polynomial engine 314 along with the extended 300 and immediate 302 neighborhood pixel values. In one embodiment, the polynomial engine includes 12 multipliers 316 for multiplying the coefficients received from the matcher 312 against each of the pixels of the neighborhoods 300, 302. The results of the multiplication is provided to an adder 318 which sums the multiplication, and outputs a value 320 for an unknown pixel T. In another embodiment, the polynomial engine consists of a pipelined multiplier accumulator.

Note that for images having two columns and two rows on the borders of the image containing incomplete neighborhoods, various techniques can be used to determine pixel values. These techniques include replication of boundary values, mirroring/reflecting of boundary values, and explicit exclusion of the two columns and rows on each border that are commonly used to solve this problem and are well understood by one schooled in the art.

Figure 6:
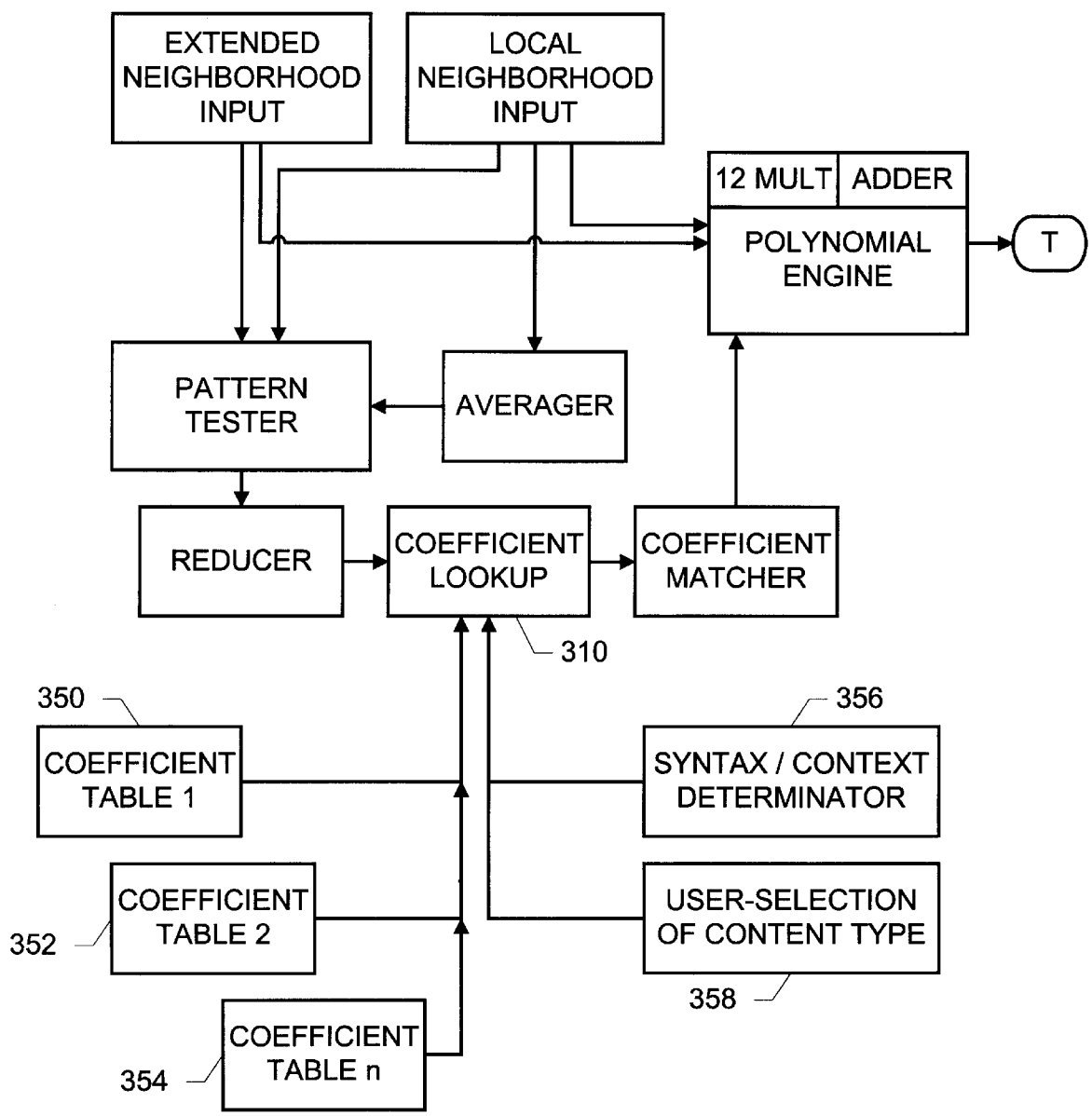
FIG. 6 illustrates an embodiment for facilitating determining image context.

FIG. 6 illustrates an embodiment for facilitating determining image context.

In this embodiment, the coefficient lookup 310 of FIG. 5 receives input from different coefficient tables 350, 352, 354, a syntax/context determinator 356, and a user-selection 358 of content type. Each coefficient table corresponds to tables designed for different contexts, e.g., portrait mode, speed mode, indoor lighting, etc. The user-selection corresponds to a user (e.g., of an imaging device such as a camera) identifying a particular context, which causes the appropriate coefficient table 350, 352, 354 to be used. However, rather than simply relying on the user-selection of context, in addition, different regions of the input image data is also analyzed with the syntax/context determinator 356 to identify contexts for sub-portions of the image data. In one embodiment, this determination takes precedence over the user-selection, leaving the user-selection 358 as a default context when one is not otherwise determined.

Having described and illustrated the principles of the invention with reference to illustrated embodiments, it will be recognized that the illustrated embodiments can be modified in arrangement and detail without departing from such principles. For example, while the foregoing description focused—for expository convenience—on up-sampling the green plane of digital images, it will be recognized that the same techniques and analyses discussed above can be applied to up-sampling planes of other colors. For example, the red and blue planes can be up-sampled using existing. up-sampling techniques oriented specifically to linearly decimated planes. These planes can also be used to steer value selections for the green plane using a process known as plane correlation. In addition, the above-described techniques may also be used to process video information and other digital image data formats.

It is understood by those skilled in the art that the invention may be practiced in different environments, and may be described by reference to different high-level program modules and/or low-level hardware contexts. Those skilled in the art will realize that program module references can be interchanged with low-level instructions. Program modules include procedures, functions, programs, components, data structures, and the like, that perform particular tasks or implement particular abstract data types. The modules may be incorporated into single and multi-processor computing systems, as well as hand-held devices and consumer devices (e.g., digital cameras, Personal Digital Assistants (PDAs), cellular telephones, etc.). It is understood that modules may be implemented on a single computing device, or processed over a distributed network environment, where modules can be located in both local and remote memory storage devices.

An exemplary computing system includes a system bus for coupling together various components within the computing device. Typically, attached to the bus are processors, a memory (e.g., volatile, non-volatile memory), storage devices, a video interface, input/output interface ports, and a network interface. The storage systems and associated computer-readable media provide storage of data and executable instructions for the computing device. Note that storage options include hard-drives, floppy-disks, optical storage, magnetic cassettes, tapes, flash memory cards, memory sticks, digital video disks, and the like.

A computing device can store and execute a number of program modules within the memory and storage devices. Typical program modules include an operating system (e.g., Microsoft Windows CE/9x/NT, Unix/Linux, Macintosh, 3Com/Palm, proprietary, etc.), and application programs such as a web browser, image manipulation tools, etc. Computing devices may operate in a networked environment using logical connections to one or more remote computing devices. For example, one computing device may be a digital camera in communication with another digital imaging computing device.

Even though the foregoing discussion has focused on particular embodiments, it is understood that other configurations are contemplated. In particular, even though the expressions "in one embodiment" or "in another embodiment" are used herein, these phrases are meant to generally reference embodiment possibilities, and are not intended to limit the invention to those particular embodiment configurations. These terms may reference the same or different embodiments, and unless indicated otherwise, are combinable into aggregate embodiments.

Consequently, in view of the wide variety of permutations to the above-described embodiments, the detailed description is intended to be illustrative only, and should not be taken as limiting the scope of the invention. Rather, what is claimed as the invention, is all such modifications as may come within the scope and spirit of the following claims and equivalents thereto.

What is claimed is:

1. A method for determining a value for an unknown pixel T, in which T is a selected pixel of an input image having an input image type, the method comprising:
   selecting an immediate neighborhood of pixel values and an extended neighborhood of pixels values;
   computing an average pixel value of the immediate neighborhood of pixel values;
   comparing said average pixel value to said immediate and extended neighborhood pixel values and determining a binary pattern based on the comparing;
   reducing the binary pattern and identifying a set of coefficients for the reduced binary pattern;
   providing plural lookup tables defined with respect to different image types;
   selecting a lookup table according to the input image type, said selected lookup table including the set of coefficients; and
   in parallel, for each of a selected transformation of a set of transformations: determining a transformed pattern by applying the selected transformation to the binary pattern, locating the transformed pattern in said selected lookup table, and matching the set of coefficients, according to the selected transformation, to each pixel of the immediate and extended neighborhoods.

2. The method of claim 1, wherein the reducing and identifying comprises performing determining the transformed pattern.

3. The method of claim 1, in which a pattern-store contains coefficients associated with patterns stored therein.

4. The method of claim 1, wherein the immediate and extended neighborhood pixels are arranged in a grid pattern, said immediate neighborhood pixels encircling T, and said extended neighborhood pixels encircling the immediate neighborhood pixels.

5. The method of claim 1, in which the image is broken into plural color planes, the method further comprising:
   applying at least the selecting, computing, comparing and reducing operations to a first of said color planes; and
   determining values for a second of said color planes based at least in part on said first color plane.

6. The method of claim 1, wherein at least a subset of the plurality of lookup tables is embedded within the input image.

7. The method of claim 1, further comprising:
   formatting the input image according to a distribution media type embedded in the input image, said distribution media type being a selected one of: Internet streaming content, local-network content, low-speed network, high-speed network, specified bandwidth network, wireless, and cellular;
   wherein said formatting comprises resizing the input image and reducing color depth.

8. The method of claim 1, in which T is a selected pixel of an input image, and the input image has an embedded output media type, and wherein the value assigned to T is constrained according to a characteristic of the output medium.

9. The method of claim 1, further comprising:
   capturing an input image with an image capturing device; and
   determining an image type for the input image, said type denoting at least a selected one of the activity of: moving, fast-action, portrait, close-up, distance, high-contrast, low-contrast, specified-contrast, Internet, indoor, outdoor, artificial-lighting, and fluorescent-lighting;
   wherein T is a selected pixel of said input image.

10. The method of claim 9, wherein the image capturing device is a selected one of a charged coupled device (CCD), camera, video-camera, or scanner.

11. The method of claim 9, wherein the input image is received over a network.

12. The method of claim 9, wherein the input image is received over a network in communication with the image capturing device.

13. A readable medium including instructions encoded thereon for computing a value for an unknown pixel T, said instruction capable of directing a processor to:
   compute an average pixel value of an immediate neighborhood of pixel values;
   compare said average pixel value to said immediate and an extended neighborhood pixel values;
   determine a binary pattern based on the comparing;
   reduce the binary pattern and identify a set of coefficients for the reduced binary pattern;
   provide plural lookup tables defined with respect to different image types;
   select a lookup table according to the input image type, said selected lookup table including the set of coefficients; and in parallel, for each of a selected transformation of a set of transformations:
    determining a transformed pattern by applying the selected transformation to the binary pattern,
    locating the transformed pattern in said selected lookup table, and matching the set of coefficients, according to the selected transformation, to each pixel of the immediate and extended neighborhoods.

14. The medium of claim 13, in which the image is broken into plural color planes, and wherein the machine-accessible media further includes data, when accessed, results in the machine performing: applying at least the selecting, computing, comparing, and reducing operations to a first of said color planes; and determining values for a second of said color planes based at least in part on said first color plane.

15. A method for determining a value for an unknown pixel T of an input image having an input image type, comprising:
    selecting an immediate neighborhood of pixel values and an extended neighborhood of pixels values;
    determining a binary pattern based on comparing an average pixel value of the immediate neighborhood of pixel values to said immediate and extended neighborhood pixel values;
    reducing the binary pattern and identifying a set of coefficients for the reduced binary pattern;
    determining a transformed pattern by applying a transformation to the binary pattern;
    selecting a lookup table defined with respect to the input image type, the lookup table including the set of coefficients; and
    locating the transformed pattern in said selected lookup table, and matching the set of coefficients to the immediate and extended neighborhoods.

16. The method of claim 15, wherein the immediate and extended neighborhood pixels are arranged in a grid pattern, said immediate neighborhood pixels encircling T, and said extended neighborhood pixels encircling the immediate neighborhood pixels.

17. An article comprising a machine-accessible media having associated data for determining a value for an unknown pixel T of an input image having an input image type, wherein the data, when accessed, results in a machine performing:
    selecting an immediate neighborhood of pixel values and an extended neighborhood of pixels values;
    determining a binary pattern based on comparing an average pixel value of the immediate neighborhood of pixel values to said immediate and extended neighborhood pixel values;
    reducing the binary pattern and identifying a set of coefficients for the reduced binary pattern;
    determining a transformed pattern by applying a transformation to the binary pattern;
    selecting a lookup table defined with respect to the input image type, the lookup table including the set of coefficients; and
    locating the transformed pattern in said selected lookup table, and matching the set of coefficients to the immediate and extended neighborhoods.

18. The medium of claim 17, wherein the machine-accessible media further includes data, when accessed, results in the machine performing:
    determining the immediate and extended neighborhood pixels as a grid pattern having said immediate neighborhood pixels encircling T, and said extended neighborhood pixels encircling the immediate neighborhood pixels.

* * * * *

UNITED STATES PATENT AND TRADEMARK OFFICE
CERTIFICATE OF CORRECTION

PATENT NO.      : 6,580,837 B1
DATED           : June 17, 2003
INVENTOR(S)     : Johnson It is certified that error appears in the above-identified patent and that said Letters Patent is hereby corrected as shown below:

Column 3,
Line 28, delete "coupied", insert -- coupled --.

Signed and Sealed this

Seventh Day of October, 2003

JAMES E. ROGAN
*Director of the United States Patent and Trademark Office*